(12) United States Patent
Kritchko et al.

(10) Patent No.: US 10,831,779 B2
(45) Date of Patent: *Nov. 10, 2020

(54) SEAMLESS DATA MIGRATION ACROSS DATABASES

(71) Applicant: Microsoft Technology Licensing, LLC, Redmond, WA (US)

(72) Inventors: Vladimir Kritchko, Sammamish, WA (US); Xin He, Sammamish, WA (US); Vladimir V. Grebenik, Redmond, WA (US); Kangrong Yan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 314 days.

This patent is subject to a terminal disclaimer.

(21) Appl. No.: 15/634,552

(22) Filed: Jun. 27, 2017

(65) Prior Publication Data
US 2017/0357645 A1    Dec. 14, 2017

Related U.S. Application Data

(63) Continuation of application No. 14/196,655, filed on Mar. 4, 2014, now Pat. No. 9,720,991.

(51) Int. Cl.
*G06F 16/27* (2019.01)
*G06F 16/21* (2019.01)
*G06F 16/22* (2019.01)
*G06F 16/2455* (2019.01)

(52) U.S. Cl.
CPC ............ *G06F 16/27* (2019.01); *G06F 16/214* (2019.01); *G06F 16/2282* (2019.01); *G06F 16/2455* (2019.01); *G06F 16/273* (2019.01)

(58) Field of Classification Search
None
See application file for complete search history.

(56) References Cited

U.S. PATENT DOCUMENTS

| 5,825,921 A | 10/1998 | Dulong |
| 6,199,179 B1 * | 3/2001 | Kauffman ............. G06F 9/5077 714/11 |
| 6,434,748 B1 | 8/2002 | Shen et al. |

(Continued)

FOREIGN PATENT DOCUMENTS

WO    201273541 A1    12/2012

OTHER PUBLICATIONS

Non- Final Office Action Issued in U.S. Appl. No. 14/196,655, dated Jan. 5, 2016, 7 Pages.

(Continued)

*Primary Examiner* — Wilson Lee
(74) *Attorney, Agent, or Firm* — Talem IP Law, LLP

(57) ABSTRACT

Techniques are disclosed for enabling the migration of data with minimized impact on consumers of the data. A data migration agent updates pointers to active data locations and coordinates a migration from a first data resource to a second data resource so that seamless migration may be carried out. A data access layer of a distributed computing environment can take advantage of the pointers and metadata written by the data migration agent to serve requests to resources of the distributed computing environment so that read availability is available regardless of migration status.

15 Claims, 9 Drawing Sheets

(56) References Cited

U.S. PATENT DOCUMENTS

| | | | |
|---|---|---|---|
| 6,523,102 B1 | 2/2003 | Dye et al. | |
| 6,640,249 B1* | 10/2003 | Bowman-Amuah | G06F 8/36 |
| | | | 709/228 |
| 7,289,964 B1* | 10/2007 | Bowman-Amuah | |
| | | | G06F 9/5038 |
| | | | 705/1.1 |
| 8,156,208 B2* | 4/2012 | Bornhoevd | G06F 9/5044 |
| | | | 709/221 |
| 8,341,459 B2 | 12/2012 | Kaushik et al. | |
| 8,429,362 B1 | 4/2013 | Natanzon et al. | |
| 8,433,771 B1* | 4/2013 | Ellsworth | H04L 67/125 |
| | | | 709/213 |
| 9,990,253 B1* | 6/2018 | Rajimwale | G06F 11/1435 |
| 2002/0156764 A1 | 10/2002 | Goudie et al. | |
| 2003/0155218 A1 | 8/2003 | Panagl | |
| 2004/0117358 A1* | 6/2004 | von Kaenel | G06Q 40/08 |
| 2005/0050240 A1 | 3/2005 | Wilkins et al. | |
| 2005/0132121 A1 | 6/2005 | Robinson | |
| 2006/0248381 A1 | 11/2006 | Fujita et al. | |
| 2011/0106795 A1 | 5/2011 | Maim | |
| 2011/0219208 A1 | 9/2011 | Asaad et al. | |
| 2012/0109940 A1* | 5/2012 | Ishii | G06F 16/9535 |
| | | | 707/722 |
| 2012/0131309 A1 | 5/2012 | Johnson et al. | |
| 2012/0226832 A1 | 9/2012 | Niino | |
| 2012/0226860 A1 | 9/2012 | Saito et al. | |
| 2012/0264880 A1 | 10/2012 | Javier et al. | |
| 2013/0110778 A1 | 5/2013 | Taylor et al. | |
| 2013/0145085 A1 | 6/2013 | Yu et al. | |
| 2013/0173547 A1 | 7/2013 | Cline et al. | |
| 2013/0246553 A1 | 9/2013 | Lee | |
| 2014/0201155 A1 | 7/2014 | Vijayan et al. | |
| 2015/0134797 A1* | 5/2015 | Theimer | H04L 41/24 |
| | | | 709/223 |

OTHER PUBLICATIONS

Non-Final Office Action Issued in U.S. Appl. No. 14/196,655, dated Nov. 17, 2016, 8 Pages.

Notice of Allowance Issued in U.S. Appl. No. 14/196,655, dated Mar. 24, 2017, 8 Pages.

Final Office Action Issued in U.S. Appl. No. 14/196,655, dated Jul. 26, 2016, 8 Pages.

Elmore, et al., "Zephyr: Live Migration in Shared Nothing Databases for Elastic Cloud Platforms", In Proceedings of the ACM SIGMOD/PODS International Conference on Management of data, Jun. 12, 2011, 12 pages.

Data Migration Stages, Retrieved on: Oct. 9, 2013, Available at: http://publib.boulder.ibm.com/infocenter/ibmxiv/r2/index.jsp?topic=%2Fcom.ibm.help.xiv.doc%2FGen2%2Fxiv_po_ch09_02.html.

Das, et al.,"Albatross: Lightweight Elasticity in Shared Storage Databases for the Cloud using Live Data Migration" In Proceedings of the VLDB Endowment, vol. 4, Issue 8, May 2011, 12 pages.

* cited by examiner

SEAMLESS DATA MIGRATION ACROSS DATABASES

CROSS REFERENCE TO RELATED APPLICATION

This application is a continuation of U.S. Ser. No. 14/196,655, filed Mar. 4, 2014.

BACKGROUND

In large-scale distributed and cloud computing environments, database systems may run thousands of transactions per minute servicing client requests. All or part of the data on one database resource may be migrated to another database resource for maintenance or other reasons. It is generally desirable to avoid data loss during the migration as well as minimize loss of read availability. Sometimes, the database is taken off-line during migration to ensure that data is not corrupted during the migration operation. However, some databases can be very large and take a long time to copy, making it impractical or unattractive to take a database offline and unavailable to clients for long periods of time while data is being copied.

BRIEF SUMMARY

Techniques are disclosed that can enable the migration of data with minimal impact on consumers of the data. A seamless data migration provides continuous read access of data. In addition to maintaining read access of data by consumers, implementations described herein may produce minimal disruption for read-write access of the data.

According to certain implementations, a migration agent is provided that manages the migration of data from a source to a target and updates pointers to the active data source so that the appropriate data (whether at the source or the target) can be located in response to a request from a data consumer. A data access layer can be provided to make the locating of the data transparent to the data consumer.

According to an implementation, a data migration agent can control the timing for data migration from a first data source to a second data source. The migration agent communicates with the first data source and the second data source to facilitate migration of the data from the first data source to the second data source. The migration agent also communicates with a third data source that stores pointers to an active data source. The migration agent can adjust pointers at the third data source to indicate active data according to the migration state. The migration agent can also write metadata to the first and second data sources according to the migration state. The first data source can provide a source partition, the second data source can provide a target partition, and the third data source can be part of a locator service each of which can be transparent to consumers through a data access layer.

A data locator service can read the pointer information from the third data source and the metadata of the resource to which the pointer refers to determine the active data source for serving the consumer's request. The data locator service can support the data access layer in accessing data on behalf of the consumer even during data migration. In many cases, the data may be read regardless of the status of the migration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
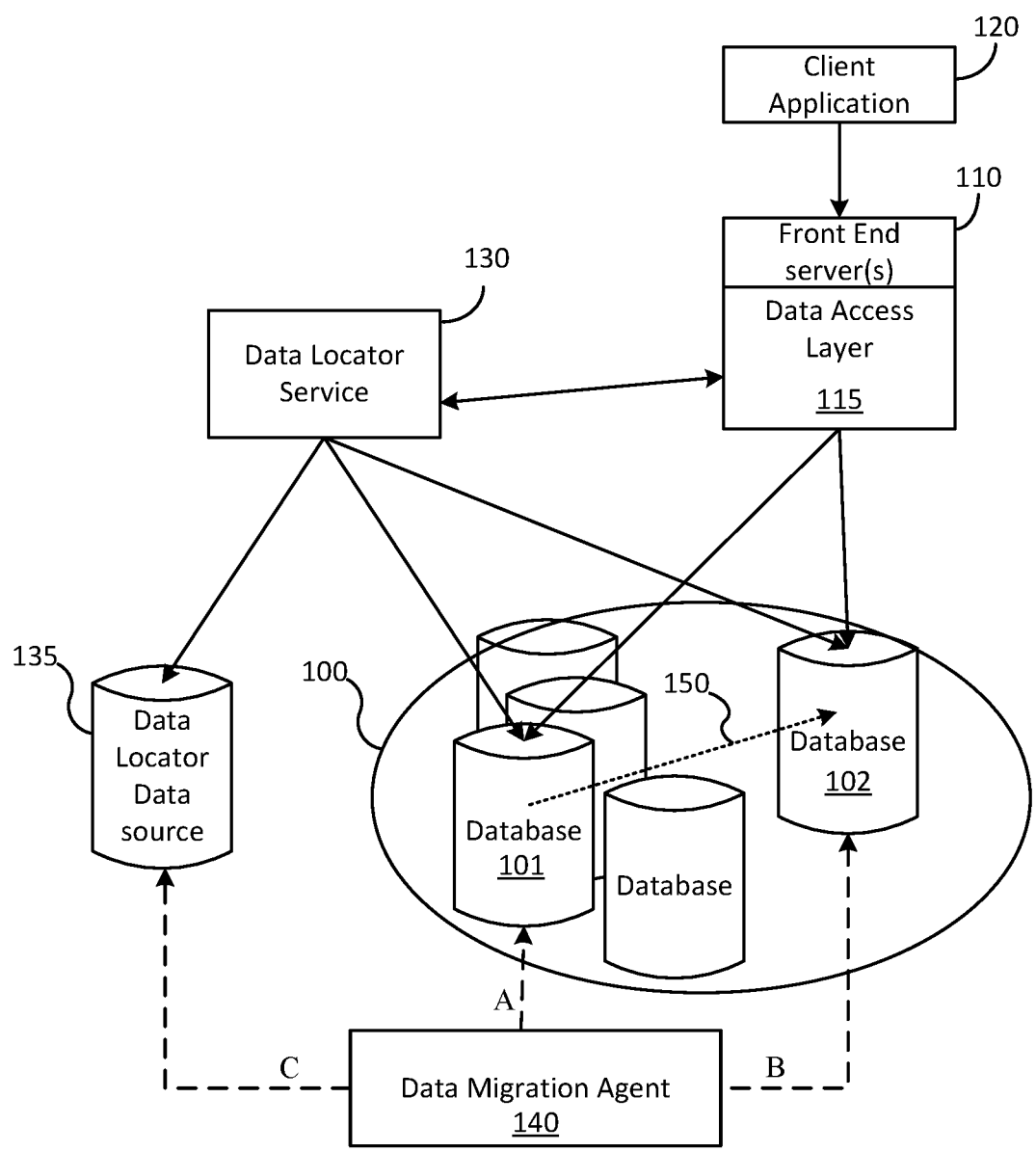
FIG. 1 illustrates a block diagram of an environment in which seamless data migration may be carried out.

Techniques are disclosed that can enable the migration of data with minimal impact on consumers of the data. The described techniques may be implemented in distributed and cloud computing environments to facilitate seamless migration of data regardless of the size of the data content being migrated.

A distributed system refers to a system in which data is located, or resides, on physically different machines. Distributed and cloud computing environments use shared resources to facilitate enterprise and personal productivity. Application services, such as for email, information management, productivity, social network, security, domain control, and database management, may be run in such distributed and/or cloud computing environments.

In an environment in which data is stored on shared resources and managed by an application or service, such as a conventional database management system (DBMS), email system, or other application service, the mechanics behind organizing and accessing a resource to service a request are transparent to the consumers of the data.

In such distributed or cloud computing environments, the particular database to which a request is mapped (and the related processes) may be transparent to the data consumers through the use of an intermediate layer. This intermediate layer, or component, can be referred to as a data access layer. According to certain embodiments described herein, the data access layer of a shared resource environment can access data on behalf of a consumer regardless of whether data is being migrated from one data source to another data source.

Various embodiments include a data locator component, which may be a dedicated or identifiable data source available to the data access layer through a data locator service. The data locator service (either as a separate service or part of the data access layer) can then be incorporated in the techniques used to identify the appropriate resource handling a data consumer's request. A data locator service can read the pointer information from the dedicated or identifiable data source of the data locator component, and the metadata of the resource to which the pointer refers to determine the active data source for serving the consumer's request. The data locator service can access data on behalf of the consumer even during data migration. In many cases, the data may be read regardless of the status of the migration, providing seamless data migration.

Data migration refers to the process of relocating all or part of the data in a database from one logical or physical location to another. Data migration may be carried out when a database has grown too large to reside on a single computing system, when upgrading hardware or software, or when making many other kinds of systems changes.

The timing and management of data migration (and the management of the data locator component) can be carried out by a migration agent. The migration agent can write metadata to data sources as well as the data source of the data locator component. According to certain implementations, a migration agent is provided that manages the migration of data from a source to a target and updates pointers to the active data source so that the appropriate data (whether at the source or the target) can be located in response to a request from a data consumer.

FIG. 1 illustrates a block diagram of an environment in which seamless data migration may be carried out. Referring to FIG. 1, a distributed system may include a group of functionally interchangeable servers or resources 100. The servers or resources 100 can include various storage devices or systems. These resources 100 may be taken on and off-line and additional resources may be added. The resources 100 may be located together in a same space, such as at a single data center, or they may be located individually and/or in clusters at different geographical locations. In the illustrated implementation, the resources 100 can store databases including a first database 101 and a second database 102.

A database may be any organized collection of data. The term "database" refers to the data and the data structures that support it. Often, large amounts of data are managed and stored in structured databases so that applications are able to conveniently make use of the data. A database may reside on a single storage device or system or on multiple storage devices or systems such as available at one or more data centers.

It should be noted that many organizations of data may be thought of as a database which are not conventionally understood in that way. For example, an extensible markup language (XML) file may be a database in that the file is a structured organization of information, often arranged hierarchically, wherein the information is delineated by descriptive tags. A word processing document might also be considered a "database" by virtue of containing text that is organized according to sentences and paragraphs interspersed by text formatting commands. Nothing herein should be interpreted as narrowing the definition of a database to a particular structure, file format, or data type.

A database may, in some cases, be managed by a DBMS. Examples of DBMSs are Microsoft® SQL Server®, MySQL™, Oracle®, dBASE™, Visual FoxPro®, SAP®, and Microsoft Access®. An email server such as Microsoft Exchange Server® may be thought of as a DBMS, since it provides structural and management support for the storage and routing of email messages, email users, contacts, and other information. Other DBMSs include Apple® Open Directory, Novell® eDirectory™ and Microsoft Active Directory®, which may manage a structured database containing the configuration of computing devices and the security and access profiles of users, often on large corporate or cloud computing networks. Larger DBMS systems like these may reside on one or more physical or virtual computing systems called "servers," (see also FIG. 7). However, in the example of an XML file noted above, the operative DBMS may be thought of as the code written to process XML. In the example of a word processing document noted above, the word processing application is the "DBMS". It is not uncommon in colloquial usage that DBMSs may be referred to as "databases."

In the example environment illustrated in FIG. 1, the databases are accessed, and the data consumed, through an intermediate layer. That is, data consumers may transparently access databases located at the resources 100 through a data access layer 115 that can be part of the systems and servers in the distributed system.

A data consumer may be any software, hardware, or firmware application that makes use of data. This may include, for example, a desktop application, a server application, a mobile client application, and an application hosted in a web browser. In the case of an application hosted in a web browser, the web browser application may be a "client," while the actual consumer of the data is the front-end server or web server that accesses the data then renders the results back to the web application. In some cases, a data consumer may use a standardized "language," such as SQL (Structured Query Language), for requesting data.

For example, a front end server 110 may be a data consumer and access the data via a data access layer 115. The data access layer 115 can be implemented on the same system or server as that consuming the data (e.g., the front end server 110) or implemented on a separate system or server from that consuming the data.

A client application 120 may access the data via the front end server 110. The client application 120 may be a web browser application or a native application that communicates with a distributed or cloud service via the front end server 110.

Data access layer 115 handles the interaction with the data storage resources and hides the complexity of the underlying resources from other layers or systems, providing a centralized location for calls (requests) to the database. In this manner, client application 120 and/or front-end server 110 do not need to communicate directly with the resources 100.

In some cases, the front end server 110 can be part of a web server (or servers), and can include a presentation layer, a business logic layer, and a data layer (as well as other layers and programs). The data layer can contain the data access layer 115. The business/logic layer may be a consumer of the data and can use the data layer and even map to the data access layer. The presentation layer can arrange the results of the business/logic layer processes and/or data retrieved from the database via the data access layer for rendering by the web browser client application 120.

A data locator service 130 can facilitate the locating of an active partition (or other unit) of a database. The data locator service 130 may be integrated with the data access layer 115 or provided separate from the data access layer 115 (and even on a separate device or system) in the form of data locator service that is called by the data access layer 115 to facilitate the locating of the active partition. For example, data access layer 115 may request the location of the "live" or "active" data from the data locator service 130 before making requests for data to the resource indicated by the data locator service 130.

A data locator component 135 can be used to store pointers to the active data source. The data locator component 135 may be a dedicated or identifiable data source available to the data access layer 115 through a data locator service 130. The data locator component 135 may be a passive resource or include an active component.

The data locator service 130 can read the pointer information from the dedicated or identifiable data source of the data locator component 135, and the metadata of the resource to which the pointer refers to determine the active data source for serving the consumer's request. The data access layer 115 can access data on behalf of the consumer even during data migration. The data access layer 115 can communicate with the resources 100 including the first database 101 and the second database 102, but may not be able to communicate directly with the data locator component 135 because the data locator component may not store the pointers in a structure understood by the data access layer 115. Thus, when the data access layer includes an integrated data locator service 130, the data access layer 115 may utilize the data locator service 130 to obtain the desired information. In some cases, the data locator service 130 performs the processes described herein for determining the location of requested data; in other cases, the data locator service 130 retrieves the information from the data locator component 135 and the data access layer 115 uses that information to determine the location of requested data.

It should be noted that data locator service 130 may be implemented at varying localities in the overall system environment. In some implementations, it may be located where accessible to data access components (e.g., data access layer 115) utilized by front-end servers and client applications. The data locator service 130 may be implemented, for example, on a "server" computing device accessible by computer network to front-end servers and client applications (as described in element 830 of FIG. 8). The server may perform other functions in addition to hosting the data locator service.

Data locator service may be implemented as a programming function which may be accessible or "callable" through an API. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture. The API and related components may be stored in one or more machine-readable storage media (e.g., storage media such as hard drives, magnetic disks, solid state drives, random access memory, flash, CDs, DVDs and the like).

A data migration agent 140 is included to coordinate state transitions and initiate certain processes as data is migrated from a source to a target. For example, migration agent 140 may precisely coordinate the timing of the transition when a "target" database becomes a new "source" or "active" database at the completion of migration. An "active" database is the one currently being accessed, read, and/or written to by consumers of the data.

As an example data migration scenario, the first database 101 may be a "source database" and the second database 102 may be the "target database" to which the database is migrated (illustrated by directional data flow 150). During most stages of the migration process, the target database may not contain a complete and updated version of the data. Directional data flow 150 is shown in FIG. 1 to reflect the data migration process.

The coordinating function of the migration agent 140 is depicted by connections A, B, and C, which illustrate the communications between the migration agent 140 and the "source" database 101, "target" database 102 and a data locator component 135, which are used to initiate and conclude operations and alter the state of these entities. It should be noted that the migration agent is visually depicted in FIG. 1 as a single component, but may, in some cases, be implemented across multiple layers within the environment, including on multiple servers.

Data migration techniques described herein may be employed in distributed single-master and multi-master systems. A multi-master system refers to systems where there are many machines storing the same data (i.e. "replicas") and that could accept requests and state changes. A request may be processed on any one of the multiple active replicas and the resulting state distributed to the other replicas. In a multi-master system, there are no guarantees of where of the active replicas the latest source of truth is located.

Any or all of the components described may be implemented as part of a commercial database management system or as part of a system environment where data may need to be physically or virtually relocated. In a large corporate email environment, for example, a desktop client application may provide access to a user's mail and folder storage located in a database. Techniques described allow the database or user mail and folder storage to be moved from mail server A to mail server B with little or no impact on the user's activity within the client application.

In some implementations, the migration agent 140 may be used to manage the process flow of a data migration by enacting key processing steps and managing key state transitions of other system components. For example, the migration agent 140 can act as a coordinator, enacting and synchronizing the processing functions of several DBMS components simultaneously. A migration agent capability (with suitable user interfaces) may be provided as part of a DBMS system for use by systems engineering personnel to perform a data migration.

Figure 2:
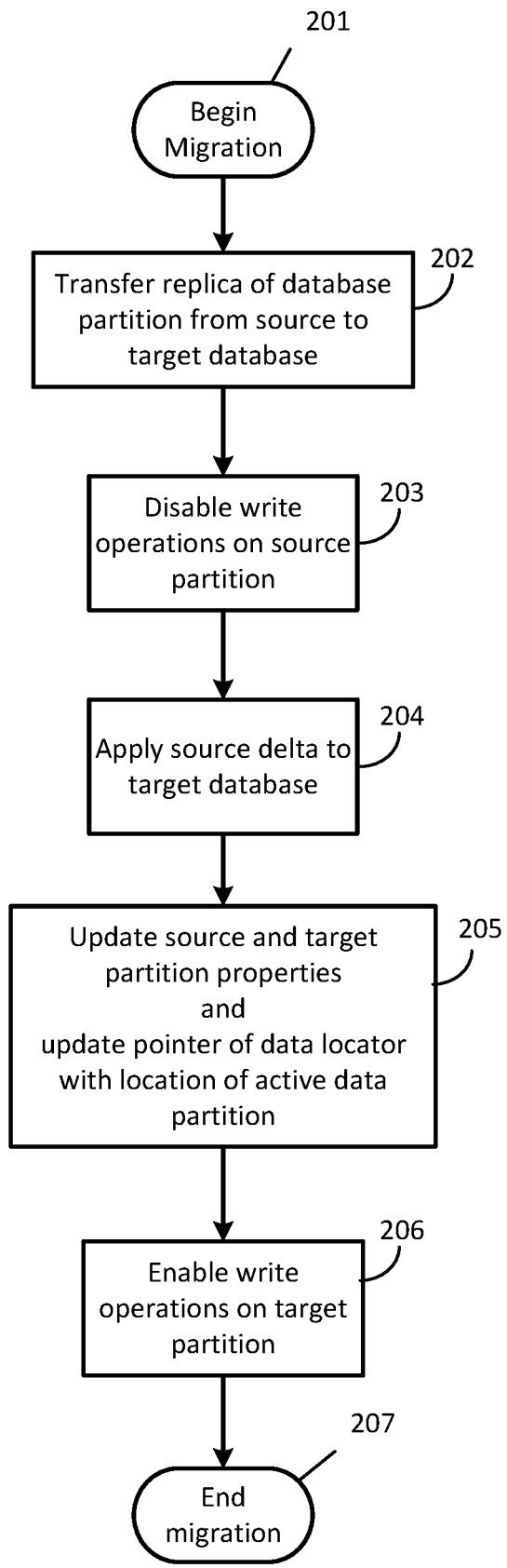
FIG. 2 shows an example process flow performing the coordinating activities of the migration agent described herein.

FIG. 2 shows an example process flow performing the coordinating activities of the migration agent described herein. In FIG. 2, an external process or administrative action may initiate the migration of a database partition (201). In some cases, a function to migrate a database may be part of a DBMS. In the first stage of the data migration, a replica of the source database partition in its current state is transferred from the source database to the target database (202).

The moniker "source database partition" or "source partition" may be used to refer to the segment of the database or the subset of data being migrated. Furthermore, the moniker "target database partition" or "target partition" may be used to refer to the segment of the database or the subset of data which is being copied to the target database, but which has not yet been completed.

A database partition may be thought of as any segment containing a subset of the data or data structures in a database. A partition may be fixed in size or variable in size based on a logical aspect of the database. A fixed size partition contains a fixed amount of data defined arbitrarily or according to an operational principle of the DBMS, like the size of a key data storage structure. On the other hand, a logically defined partition is segmented into partitions by virtue of a logical aspect of the database. In a more traditional DBMS, a logical partition might mean one or more tables, rows, or columns, irrespective of their physical storage size. The notion of a logically defined partition also encompasses higher-level divisions or segmentations of data. For example, in a DBMS implementing directory services, a partition may be segmented in accordance with the data belonging to a particular company or organizational unit.

A replica refers to a static image or copy of the data in the source partition at the exact moment in time the replica was requested. The lengthy time it may take to transfer the replica from the source to the target (e.g., when the quantity of data is very large or the source and target are widely distributed across networks) may mean that a significant number of changes occur in the source data partition after the transfer of the replica initiates but before it completes. The changes occurring after the transfer is initiated are referred to, cumulatively, as a "source delta" or "deltas". Once the replica transfer is complete, write operations on the source partition are disabled (203) so that changes to the source cease and the source delta can be applied to the target database in operation 204 without concern about writes being applied and not migrated. This short window is the only time where write operations may be unavailable to consumers of the database under the described techniques. "Write operations" on a database refer to those acts that change information, delete information, or add new information. When a database or database partition is "read-only," then changes may not be made to the data; it may only be read.

Different DBMSs may use varying techniques for creating a replica of data in the database at a specific moment in time and for generating a source delta. In some DBMSs, it may be possible to track changes with a monotonously incrementing sequence number wherein each change command receives its own unique ID. At any given time, the highest sequence number indicates the latest change. To obtain a most recent replica of data, the changes may be applied, in order, from earliest to latest (lowest to highest unique ID). In this scenario, after the initial replica is generated and transferred to the target, write operations are disabled (203) and the source delta may be applied by executing the change commands from the point just after of the last unique ID in the replica to the last unique ID in the source.

Another example of a technique for creating a replica and a source delta comes from more traditional transactional DBMSs, such as might be found in a large database server like Microsoft SQL Server®. Transactional DBMSs create a detailed log, called a "transaction log," of each change or modification to the data, in the order the change occurs. This capability allows the transformation of the data from one state recorded in a data image to a later state in time simply by applying the transaction log commands after the time the image was made to the image. As an example, this capability is frequently used to provide backup copies of data in DBMSs. Periodically, an image of the data in the database is made by reading the data from the database and copying the data to another storage area. In the case of database failure, the transactions in the transaction log may be used to transform this "snapshot" replica into a working version of the database at any point in time after the snapshot was created. This same transaction log mechanism is a possible way of tracking the source delta. By documenting a marking point in the transaction log, it is possible to track the changes in the source that occur after the snapshot begins to be transferred. In this scenario, after the initial snapshot is generated and transferred to the target, write operations are disabled (203) and the source delta may be applied by executing the change commands from the transaction log occurring after the time the snapshot transfer initiated.

Techniques for creating replicas and for creating source deltas are well known to practitioners in the art. The mechanisms described above, or various other mechanisms, may be used to create replicas and source deltas of a database partition to use in the data migration.

Over the lifetime of the various processes that occur during data migration, there may be at various times source partitions and target partitions that contain all or part of the same data. The "active partition" or "active database partition" refers to the partition that is denoted the most current instantiation of the data in a given partition. In other words, the active partition is the partition (whether it exists on the source database or the target database) that data consumers (and other components) are directed to as containing the "live" data. During much of the data migration, for example when the replica is being copied to the target, the active partition will remain the source partition and will be readable and writeable. For a short period, it will be readable but not writeable. At a later time, the target partition will become the active partition, making it read accessible to data consumers, and will be unlocked for writing.

After the source delta has been applied to the target replica (204), properties of the source and target partitions are updated and the pointer (or other metadata) of a data locator is updated (205). Updating the source, target, and data locator may be performed closely in time with one another or part of a single transaction (sometimes called "atomic"), so that the state of all three is guaranteed to be synchronized and non-conflicting. However, in some cases, such as in widely distributed systems, the three-way simultaneous update may be difficult to achieve in a single, atomic transaction. Techniques are presented that enable appropriate data access by the data access layer when the properties of the three systems are unsynchronized (see e.g., FIGS. 4A-4D).

Once the target database partition is marked as the active partition, data consumers, accessing the source or target through the data access layer, now direct their requests to the target as the locality for live data. If the default state of a partition is not write enabled (and the partition is designated to be write enabled), then write operations can be enabled on the target partition (206), resulting in completion of migration (207) and resumption of a normal operating mode.

Although a single database partition migration is described, embodiments are not limited thereto. The processing flow illustrated in FIG. 2 is suitable for migrating databases possessing multiple partitions. For example, the processing flow of FIG. 2 may be repeated several times, singly or multiply, serially or in parallel, for each of the partitions in a database to be migrated. Migration agent may or may not manage the coordination and management of the migration of multiple partitions. Depending on the specific DBMS implementation, the coordinating and scheduling of the totality of partition migrations may be managed by separate processing functions.

Figure 3:
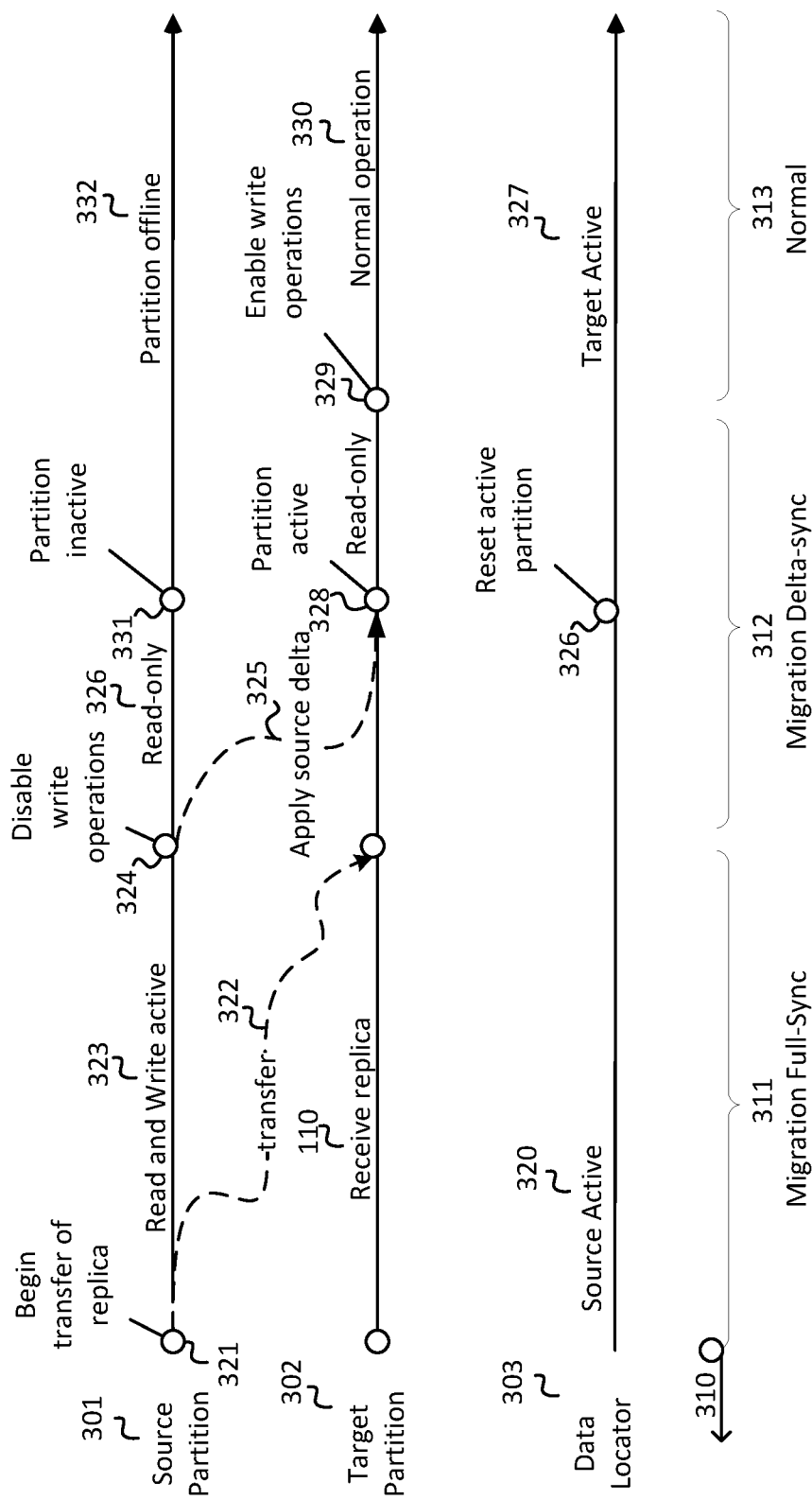
FIG. 3 illustrates an example timeline for migration phase state transitions.

FIG. 3 illustrates an example timeline for migration phase state transitions. In FIG. 3, the migration phases for a source partition 301, target partition 302, and data locator 303 are shown. Prior to the migration, the data partition in the source database system may be active and following normal operation (310).

Migration can be carried out in three phases: migration full-sync 311, migration delta sync 312, and normal operation 313. The data locator 303 can indicate that the source is active (320) prior to and during at least the first migration phase. In the first migration phase (e.g., migration full-sync 311), a replica of a database partition is taken (321) at a source database and the replica transferred from the source database to a target database (322). During the transfer of the replica (322), read and write operations are allowed (323) on the source database partition 301. Meanwhile, changes occurring at the source database partition 301 from the point of beginning the migration (i.e., source deltas) may be tracked using a transaction log or other methods as described above.

In the second migration phase (e.g., migration delta sync 312), write operations are disabled (324) at the source partition 301 so that the deltas from the source can be copied (325) to the target partition 302 without risking loss of data from write requests that may occur during the time that the source deltas are being copied. Advantageously, read requests (326) may continue to be carried out at the source database. After completion of the second migration phase, an identical copy of the source partition is present on the target partition.

Leading up to the final migration phase, a milestone occurs when the "active partition" is changed to be the target partition instead of the source partition. That is, an active partition pointer is changed (326) at the data locator 303 to indicate the target partition (327) instead of the source partition 320. The target partition may be read only when initially indicated as active (328), and in such cases, write operations can be enabled (329) subsequent to changing the pointer (326) in order to assume normal operations (330). Source partition 301 can be indicated as inactive (331) and taken offline (332). In some cases, at the time when the active partition pointer is changed (326), metadata on both the source and the target partition can be updated to reflect the location of the active partition.

In an initial state before migration, a source partition can include metadata indicating that it is active and that read and write is enabled. It should be understood that in some cases, a partition may not be write-enabled, for example, for security or other reasons. In such cases, no changes are made by the migration agent to adjust the read and write settings.

For the first migration phase, the migration agent can write the location of the target partition in the metadata of the source partition. Once transfer of the replica is completed, the migration agent can disable the write flag of the source partition (if the write was enabled prior to migration) so that transfer of the source deltas may take place. In the third migration phase, the migration agent writes to the metadata of the source partition to change the active state to inactive, writes to the metadata of the target partition to indicate that the target partition is active, and changes the pointer at the data locator from the source partition to the target partition. These actions may or may not be performed atomically.

Therefore, the data access layer (or data locator service) can perform a data location method in which the data locator pointer is first obtained, the metadata of the partition to which the pointer points is read to confirm that partition is active; and if not, then the other partition is checked and used if indicated as active; or a data location method in which a requirement of two out of the three active partition indicators must match before a request is serviced. In the second method, each partition can include an indicator of the active partition so that in the case where the pointer is incorrect, both the source and target partitions may indicate the correct partition.

FIGS. 4A-4D illustrate example scenarios of locating an active resource in response to a consumer request. A data access layer 400 may include a data locator service or call such a service to facilitate locating an active resource in response to a request from a consumer 410.

In some embodiments, a data locator service may be used to assist in tracking the state of active and inactive partitions (or "replicas") on the source and target databases. The data locator service may be used by the data access layer 400 to find active partition information for data requested by data consumers such as consumer 410. Thus, to service a request from the consumer 410, the data access layer 400 may communicate with a data locator resource 420, a source partition 422 and a target partition 424.

Figure 4A:
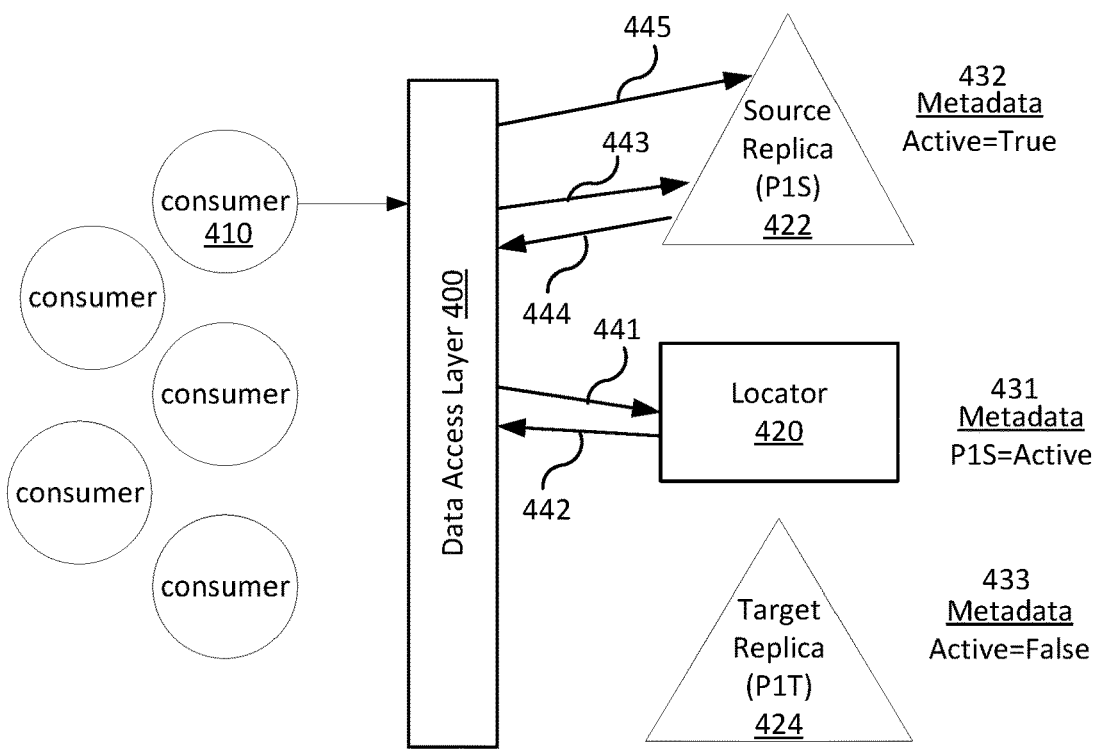
FIGS. 4A-4D illustrate example scenarios of locating an active resource in response to a consumer request.

Referring to FIG. 4A, a first scenario is illustrated in which the locator 420 points to the source partition 422 (P1S) as being active (431), the source partition 422 indicates that it is active (432), and the target partition 424 indicates that it is not active (433). In response to receiving a request from a consumer 410, the data access layer 400 may communicate (441) with the locator 420 to obtain (442) the location of the active partition according to the pointer. Since the locator 420 indicates that the source partition is active (431), the data access layer 400 then communicates (443) with the source partition 422 to read its metadata (444). Since the source partition 422 indicates that it is active (432), the data access layer 400 can confirm that the source partition 422 is the active partition and can service the request (445). The source partition data is accessible even if a data migration is occurring. That is, the data at the source partition 422 remains read-access available and in only a short timeframe (the time to transfer deltas) would write access not be available.

Figure 4B:
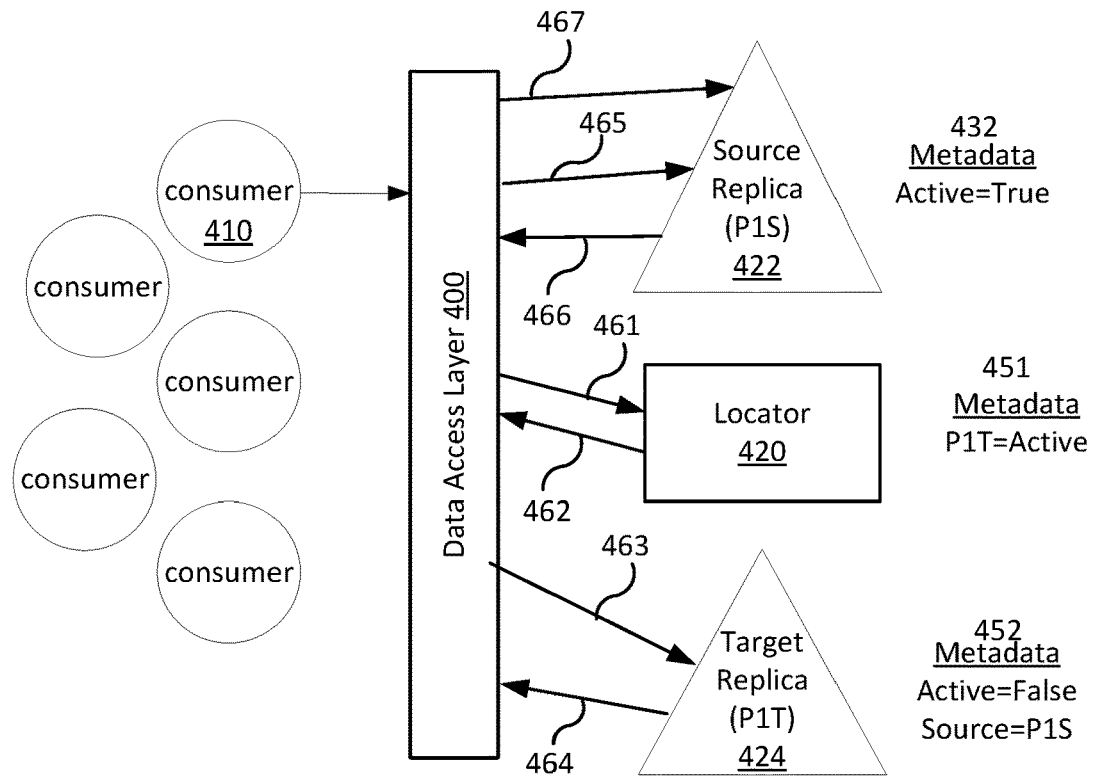

Referring to FIG. 4B, a second scenario is illustrated in which the locator 420 points to the target partition 424 (P1T) as being active (451), the source partition 422 indicates that it is active (432), and the target partition 424 indicates that it is not active (452). This scenario may occur during data migration if not all metadata has been updated at the partitions at the time that the locator pointer is updated.

Thus, in response to receiving a request from a consumer 410, the data access layer 400 may communicate (461) with the locator 420 to obtain (462) the location of the active partition according to the pointer. Since the locator 420 indicates that the target partition is active (451), the data access layer 400 then communicates (463) with the target partition 424 to read its metadata (464). Since the target partition 424 indicates that it is not active (452), the data access layer 400 can communicate (465) with the source partition 422 to confirm that the source partition 422 is the appropriate partition. Since the source partition 422 indicates that it is active (432), the data access layer 400 can confirm that the source partition 422 is the active partition (466) and can service the request (467).

Figure 4C:
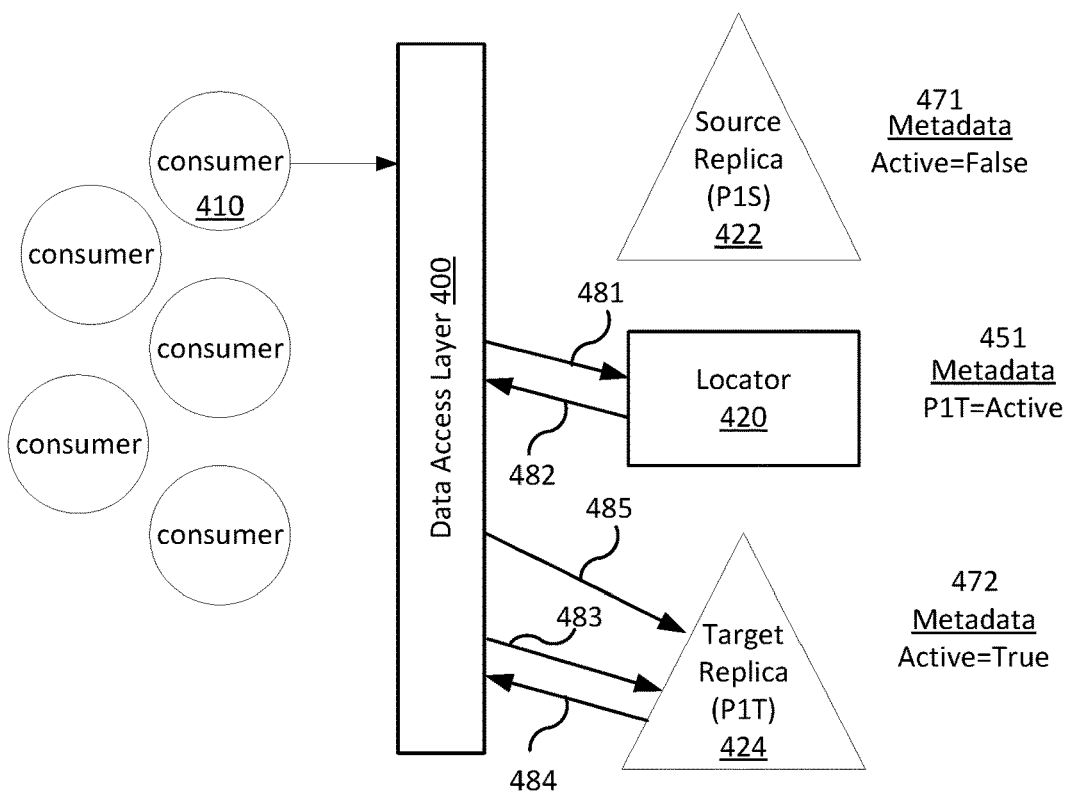

Referring to FIG. 4C, a third scenario is illustrated in which the locator 420 points to the target partition 424 (P1T) as being active (451), the source partition 422 indicates that it is not active (471), and the target partition 424 indicates that it is active (472). This scenario may be the case after migration has occurred and normal operation is established.

In response to receiving a request from a consumer 410, the data access layer 400 may communicate (481) with the locator 420 to obtain (482) the location of the active partition according to the pointer. Since the locator 420 indicates that the target partition is active (451), the data access layer 400 then communicates (483) with the target partition 424 to read its metadata (484). Since the target partition 424 indicates that it is active (472), the data access layer 400 can confirm that the target partition 424 is the active partition and can service the request (485).

Figure 4D:
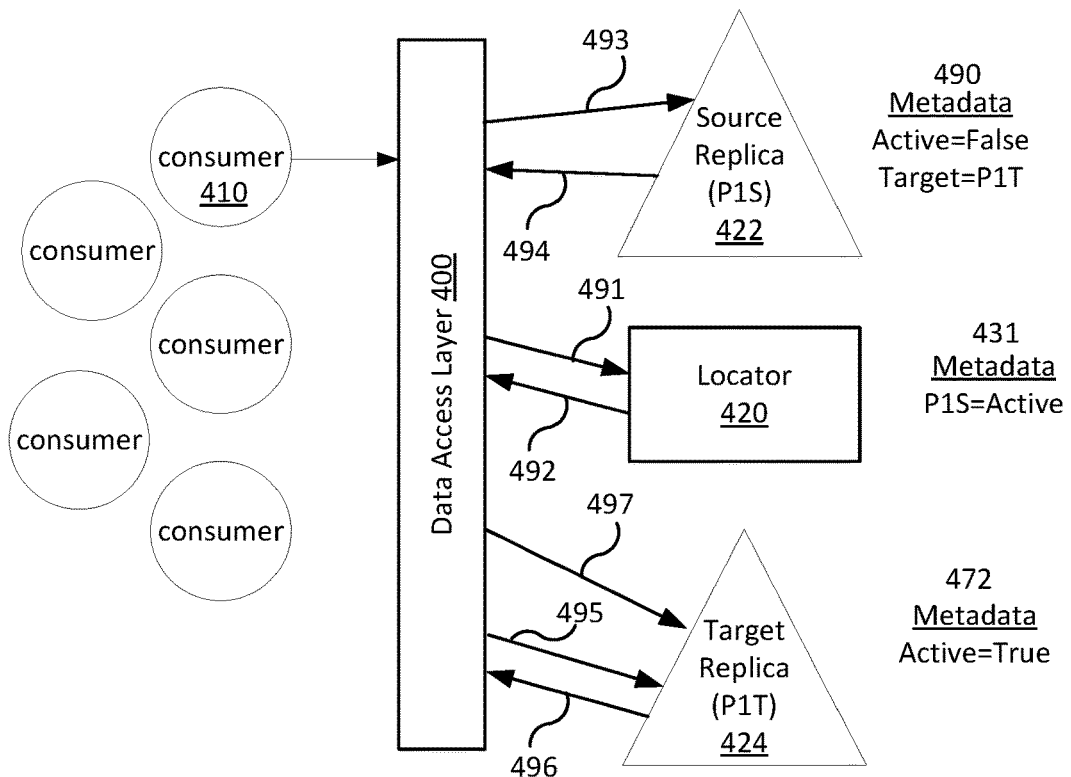

Referring to FIG. 4D, a fourth scenario is illustrated in which the locator 420 points to the source partition 422 (P1T) as being active (431); however, the source partition 422 indicates that it is not active (490), but the target partition 424 indicates that it is active (472). This scenario may occur during data migration if the metadata is updated at the target partition 424 and the source partition 422 before the locator pointer is updated.

Thus, in response to receiving a request from a consumer 410, the data access layer 400 may communicate (491) with the locator 420 to obtain (492) the location of the active partition according to the pointer. Since the locator 420 indicates that the source partition is active (431), the data access layer 400 then communicates (493) with the source partition 422 to read its metadata (494). Since the source partition 422 indicates that it is not active (490), the data access layer 400 can communicate (495) with the target partition 424 to confirm that the target partition 424 is the appropriate partition. Since the target partition 424 indicates that it is active (472), the data access layer 400 can confirm that the target partition 424 is the active partition (496) and can service the request (497).

Figure 5A:
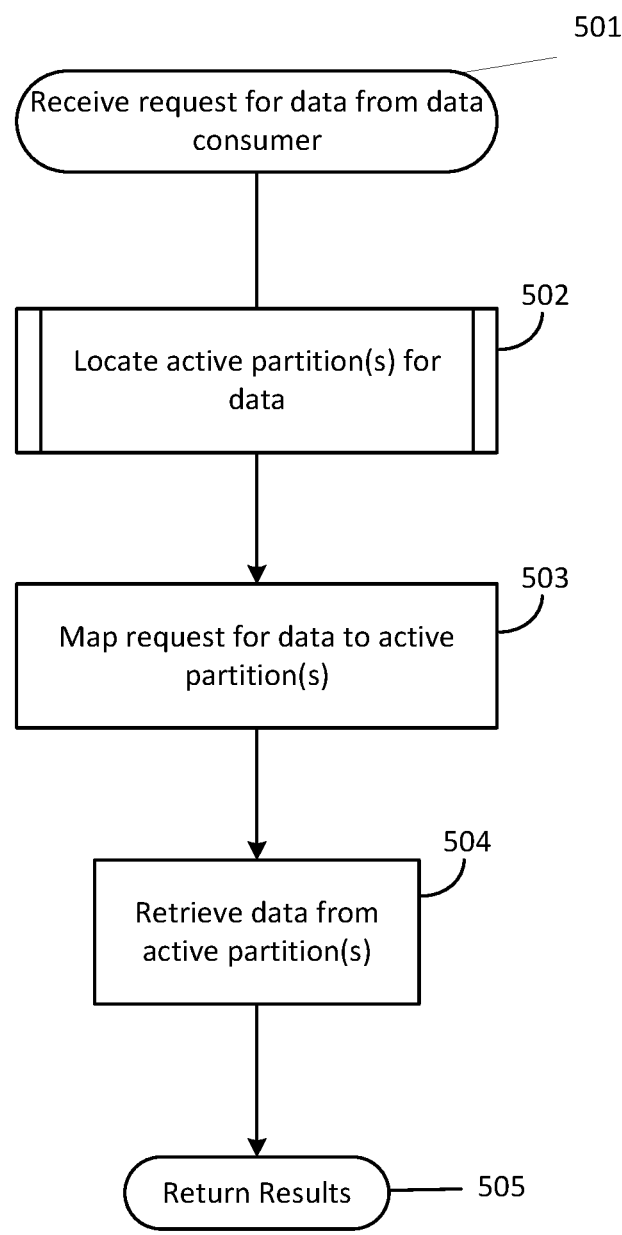
FIGS. 5A and 5B show an example process flow with processing steps that may be carried out by data access layer in some embodiments.
Figure 5B:
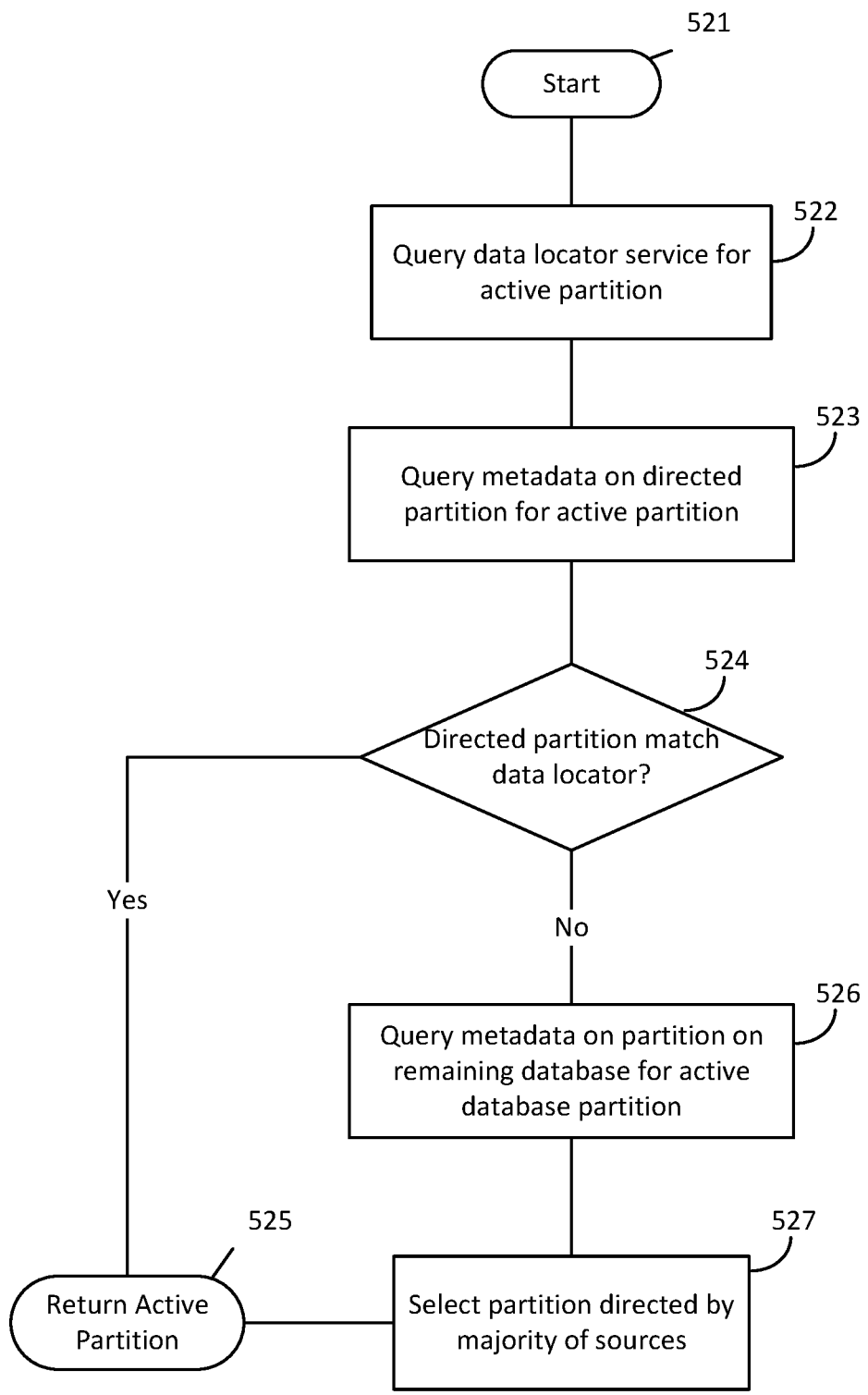

FIGS. 5A and 5B show an example process flow with processing steps that may be carried out by data access layer in some embodiments.

Referring to FIG. 5A, data access layer may receive a request for data (501) from a data consumer, possibly through a cached data object. For example, the data access layer may transparently remap cached data object identities on behalf of data consumers. Some portions of data may be out of the control of the consumers of that data. These portions of the data are instead controlled by the system and may be transformed or modified by the system. A data object identity helps a consumer identify the consumer's data when the original data entry is modified or otherwise translated by the system. The data access layer may provide instructions to carry out one or more of the methods for finding the location of the active data partition. In some cases, data access layer may consult data locator for the location of the currently active database partition.

Data consumers, whether they be desktop client applications or web servers rendering information to a web browser, sometimes cache data or other information that ties them to a particular source database. Some applications make requests that utilize resources in such a way as to require the context of a previous request to be valid. Applications that function in the manner described are sometimes called "stateful," or are said to have "state" or have "resource affinity." When data is migrated from source to target, these cached "data objects" can become out of date and cause processing errors.

It is not uncommon for higher-level data components or APIs to be provided by the operating system or a programming framework to encapsulate many of the complexities of connecting to a database and retrieving or updating data in the database. For example, once the data consumer has performed the operations necessary to connect to a database hosted on a DBMS, it may "hold" that connection as a "connection object." Likewise, a data consumer may request a particular selection of data from a database table, for example the names, addresses, and phone numbers in a customer list table where the last name of the customer starts with "M". The data consumer may hold onto this selection of data, encapsulated as an object that programming code in the consumer may later use to update or delete records from or further refine. Sometimes this "data object" is termed a "rowset", "row object", or "dataset." These techniques and terminology are familiar to practitioners in the art and need not be described further here.

In some implementations, transparent remapping of data object identities by the data access layer may be accomplished by appending a value from a system-controlled identity field to a user-controlled attribute in the target. System-controlled attributes refer to those attributes where a user has no control over the value being stored for that attribute. A system can ensure the uniqueness of the value by not giving the consumer control over the value. User-controlled attributes refer to those attributes where a consumer can choose what value to store for that attribute. When a consumer attempts to use a cached data object, it may be identified by this system-controlled identity value. When the data access layer requests from the data locator the location of the active partition for data objects, the data access layer may identify and match the identical data object on either source (by system-controlled identity value) or target (by user-controlled identity value). In this way, the data access layer and data locator may always identify and locate the active data instantiated by a given data object, even if the data object is cached by a consumer.

An advantage of the data access layer is that when server objects, connections, or datasets are cached by a data consumer, they need contain no statically mapped connection information that cannot be remapped transparently by the data access layer. Thus, for example, if the rowset object containing names and addresses described above is cached by the data consumer, data access layer will transparently remap these identities using the proposed techniques during and after the migration operations.

Returning to FIG. 5A, after receiving the request for data (501), the data access layer then identifies one or more active partitions where the data may be stored (502). In some cases, if a cached rowset object accesses a large amount of data, it may span several database partitions in varying stages of migration. In some implementations, a data locator service, such as the data locator service 130 illustrated in FIG. 1, may be accessed by the data access layer to efficiently find the active partition containing the requested data. One example implementation of locating active partition(s) for data is shown in FIG. 5B.

Referring to FIG. 5B, in response to receiving a request (521), the data access layer may query a data locator service for the location of the active partition for a given data access operation (522). Data access layer then connects to the source or the target database, depending on the location directed by the data locator service, and queries the metadata on the directed partition for the active database partition (523). If the metadata matches the data locator service (524), then the data access layer returns the active partition information (525). However, if the metadata on the first directed partition does not match the data locator service location in decision step (524), then data access layer connects to the partition on the remaining database and queries its metadata for the active database partition (526). The data partition marked active in the majority of sources (two of three, where a data locator, source and target databases exist) is then selected (527). The data access layer then returns the active partition (525) to the processing flow of FIG. 5A in operation 502.

Returning to FIG. 5A, after determining the locations of the relevant active partitions, the data request can be mapped to those partitions (503). The data request is then fulfilled on behalf of the data consumer by retrieving the data from the mapped partitions (504) and the data is returned to the data consumer (505).

In some cases, the data access layer may cache partition metadata to improve performance and reduce the overhead of repeated metadata reads. Additional coordination between the migration agent, the data locator, and source and target databases with respect to migration state transitions can be included for implementations with cached partition metadata.

For example, if data access layer retrieves data from a first partition, the data access layer may also query metadata with respect to the first partition at the same time. Data access layer may then cache this partition metadata for a variable length of time depending on what state of migration the current partition is in.

In some implementations, two cache times corresponding to certain phases of migration are envisioned: "normal operations" and "migration". Normal operation refers to those phases of migration where the source or target partition is fully active and writeable. "Migration" refers to those phases in which migration processes are being carried on, either in full-sync (e.g., 311 of FIG. 3) or in delta-sync (e.g., 312 of FIG. 3) before the target partition becomes write-enabled again.

During normal operations phases when no migration of data is occurring, data access layer may cache partition metadata for a relatively long period of time, for example for a 24-hour period. This period of time may be known as the "predefined minimum duration." During the migration full-sync phase and migration delta-sync phases, the data access layer may cache partition metadata for a shorter time, roughly corresponding to the length of time it takes to transfer a replica of a partition of the typical size for the system and apply the source delta for that replica. It should be noted that the exact length of time data access layer will cache partition metadata is variable by individual system implementation and examples are not intended to be limiting.

Figure 6A:
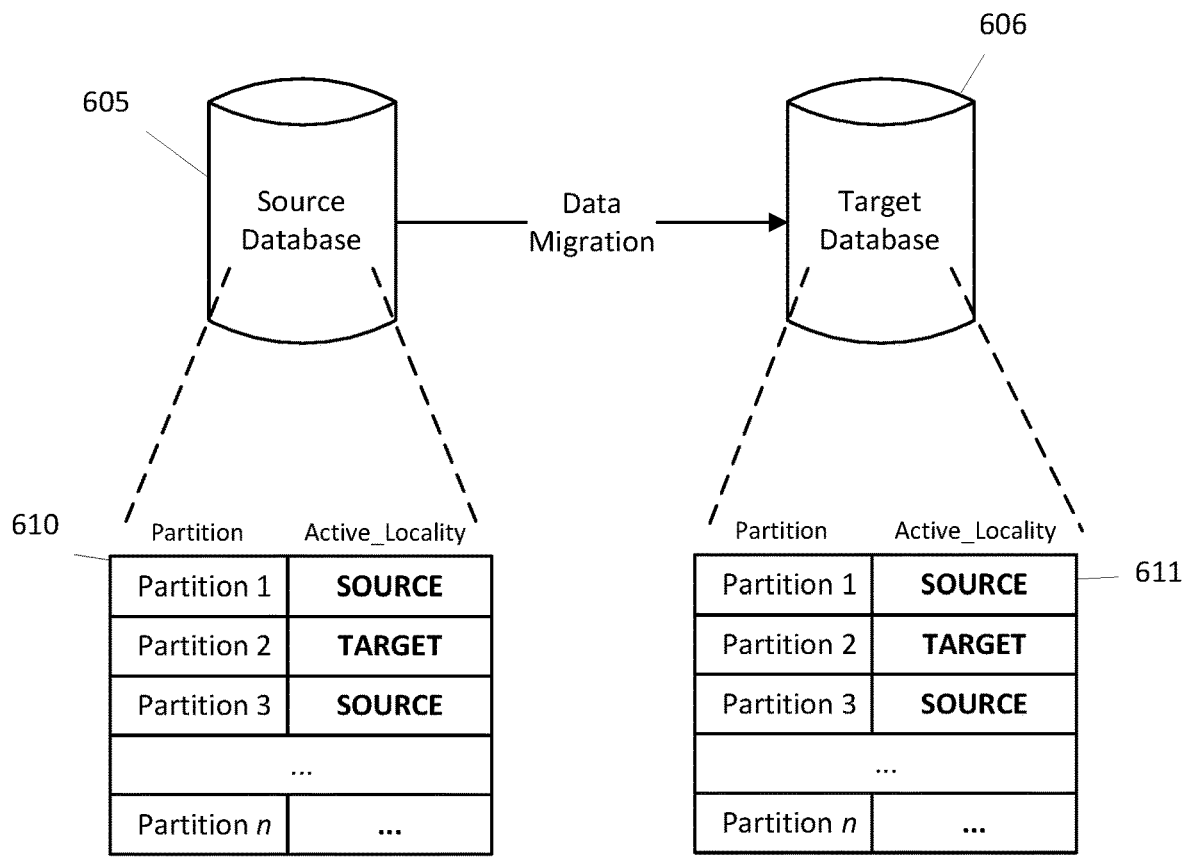
FIG. 6A shows a simple mechanism for tracking the locality of the active partition on a source or target partition itself.

In various embodiments, the source and target databases may use data structures to track the locality of the active partition, or they may use metadata on the partition itself to store this information. Metadata refers to data or properties about the database structure itself, rather than the data that is contained in it. FIG. 6A shows a simple mechanism for tracking the locality of an active partition on a source or target partition itself. In FIG. 6A, source database 605 has the locality information associated with its partition storage structure using a property or metadata tag called "Active_Locality," depicted in element 610 as an indexed property table. Target database 606 implements the same mechanism in element 611. In the figure, both tables are synchronized in their locality.

Figure 6B:
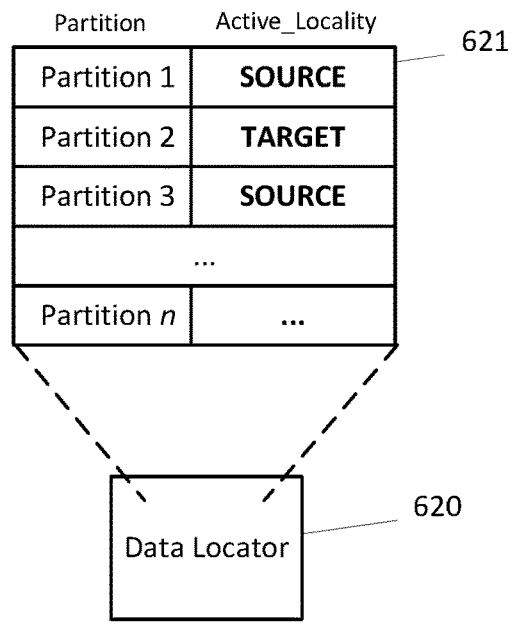
FIG. 6B shows an example data structure that tracks database partitions and the location where the partition is active.

FIG. 6B illustrates an example data structure that tracks database partitions and the location where the partition is active. In FIG. 6B, data locator 620 may include a simple list of partitions and their active locality (source or target) 621. However, as others skilled in the art will appreciate, other data structures for tracking information about a partition are envisioned, e.g., arrays and database tables.

In some embodiments, to use metadata caching as described herein may require database partitions to store additional metadata beyond the "active_locality" information described in FIG. 6A, above. Database partitions may store in addition, for example, metadata noting the current migration status of "normal operations" or "migration." This additional metadata allows data access layer to identify the current migration status, or state, so that partition metadata may be cached for the appropriate time. This additional metadata may also be modified by the migration agent in addition to locality information.

In some cases, migration phase transitions may be applied by migration agent at a minimum duration in order to assist data access layer in keeping accurate metadata when caching.

For example, if data access layer caches partition metadata for 24 hours during normal operations, then migration agent may ensure that, once it enters "migration full-sync" phase, it will not complete the migration of the partition in less time than the normal operations metadata caching time of 24 hours, also called the predefined minimum duration. This mechanism helps to ensure that data access layer metadata does not become stale and inaccurate for long periods of time.

As an extended example, if data access layer reads partition metadata at 12:01 AM and finds that the current migration state is "normal operations," it will cache the partition metadata until 12:01 AM the following day. Assume that migration begins on 1:00 AM (one hour after the data access layer cache metadata read). Migration agent will not allow completion of the migration operation until at least 1:00 AM, 24 hours later. During that time migration agent will transfer the replica and accumulate source delta changes. At 12:00 AM, data access layer reads metadata and finds that the system is now in "migration" phase, which may have, for example, a 1 hour metadata cache time. Data access layer will read new metadata at 1:01 AM, one minute after migration agent has completed the migration operation and returned migration state to "normal."

Figure 7:
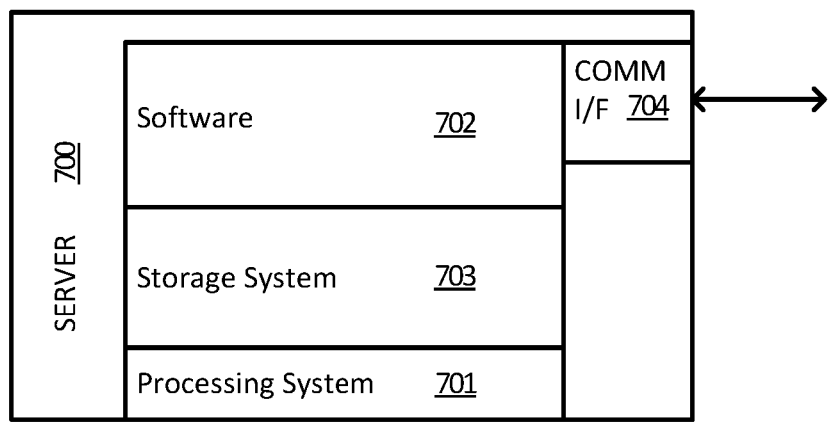
FIG. 7 shows a block diagram illustrating components of a computing device or system used in some embodiments.

FIG. 7 shows a block diagram illustrating components of a computing device or system used in some embodiments. For example, any of resources 100, data locator 130/135, and front end server(s) may be implemented as server 700, which can include one or more computing devices. The server 700 can include one or more blade server devices, standalone server devices, personal computers, routers, hubs, switches, bridges, firewall devices, intrusion detection devices, mainframe computers, network-attached storage devices, and other types of computing devices. The server hardware can be configured according to any suitable computer architectures such as a Symmetric Multi-Processing (SMP) architecture or a Non-Uniform Memory Access (NUMA) architecture.

The server 700 can include a processing system 701, which may include a processing device such as a central processing unit (CPU) or microprocessor and other circuitry that retrieves and executes software 702 from storage system 703. Processing system 701 may be implemented within a single processing device but may also be distributed across multiple processing devices or sub-systems that cooperate in executing program instructions.

Examples of processing system 701 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 703 may comprise any computer readable storage media readable by processing system 701 and capable of storing software 702. Storage system 703 may include volatile and nonvolatile, removable and non-removable media implemented in any method or technology for storage of information, such as computer readable instructions, data structures, program modules, or other data.

Examples of storage media include random access memory, read only memory, magnetic disks, optical disks, CDs, DVDs, flash memory, magnetic cassettes, magnetic tape, magnetic disk storage or other magnetic storage devices, or any other suitable storage media. Certain implementations may involve either or both virtual memory and non-virtual memory. In no case do storage media consist of a propagated signal. In addition to storage media, in some implementations storage system 703 may also include communication media over which software 702 may be communicated internally or externally.

Storage system 703 may be implemented as a single storage device but may also be implemented across multiple storage devices or sub-systems co-located or distributed relative to each other. Storage system 703 may include additional elements, such as a controller, capable of communicating with processing system 701.

Software 702 may be implemented in program instructions and among other functions may, when executed by server 700 in general or processing system 701 in particular, direct server 700 or processing system 701 to operate as described herein for enabling seamless database migration. Software 702 may provide program instructions that implement a DBMS, store and manage one or more databases, or execute methods or operations that access databases. Software 702 may implement on server 700 components, programs, agents, or layers that implement in machine-readable processing instructions the methods described herein as performed by the data access layer, migration agent, or data locator service.

Software 702 may also include additional processes, programs, or components, such as operating system software or other application software. Software 702 may also include firmware or some other form of machine-readable processing instructions executable by processing system 701.

In general, software 702 may, when loaded into processing system 701 and executed, transform server 700 overall from a general-purpose computing system into a special-purpose computing system customized to facilitate seamless data migration across databases. Indeed, encoding software 702 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage.

Server 700 may represent any computing system on which software 702 may be staged and from where software 702 may be distributed, transported, downloaded, or otherwise provided to yet another computing system for deployment and execution, or yet additional distribution.

It should be noted that many elements of server 700 may be included in a system-on-a-chip (SoC) device. These elements may include, but are not limited to, the processing system 701, a communications interface 704, and even elements of the storage system 703 and software 702.

In embodiments where the server 700 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 704 may be included, providing communication connections and devices that allow for communication between server 700 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

Figure 8:
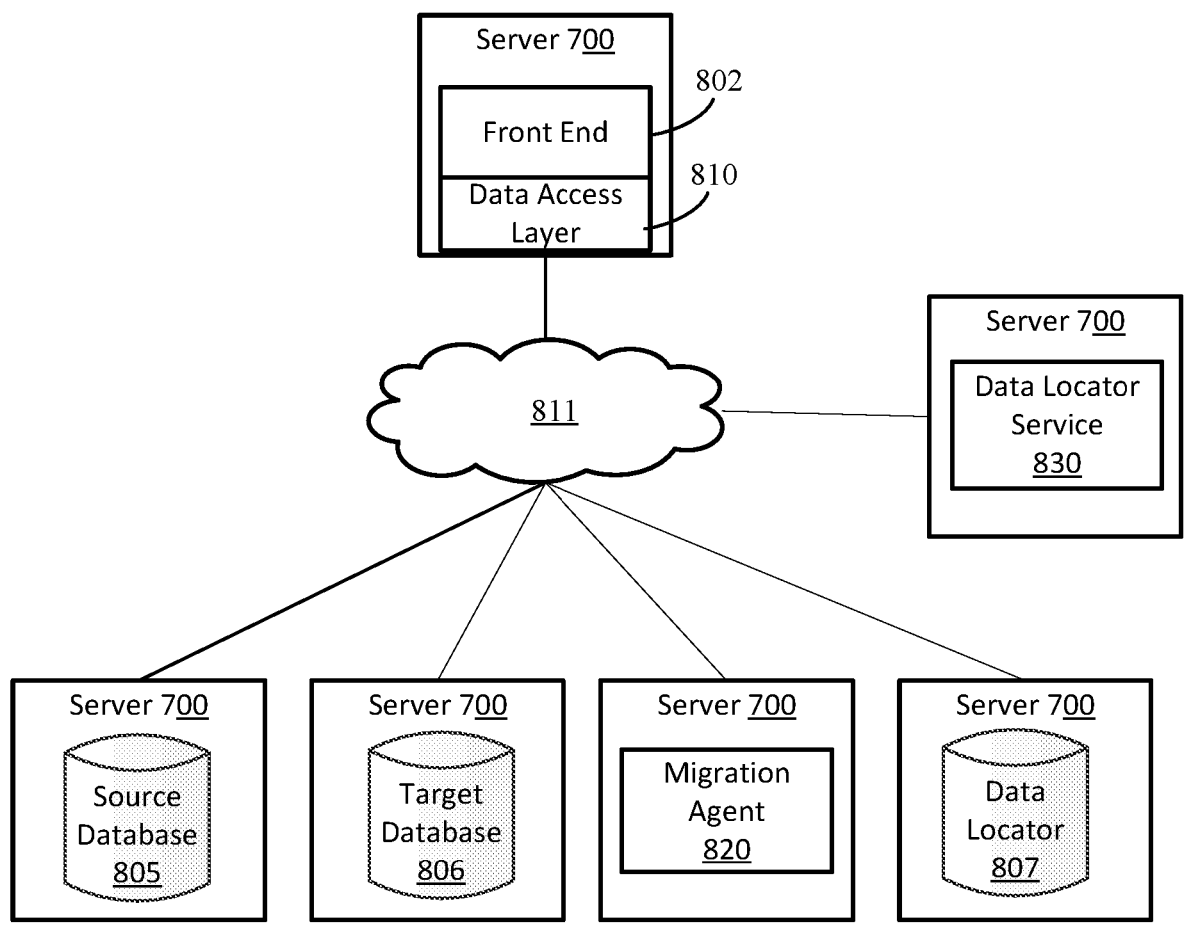
FIG. 8 illustrates an example system architecture in which an implementation of a technique for seamless data migration across databases may be carried out.

FIG. 8 illustrates an example system architecture in which an implementation of a technique for seamless data migration across databases may be carried out. In the example illustrated in FIG. 8, a data access layer 810 can be implemented on a server, such as server 700 as described with respect to FIG. 7. Server 700 may also host front end server 802 that performs other functions, such as providing web server capabilities that a client application may access via a web browser. The data access layer 810 may be implemented as software or hardware (or a combination thereof) on the server 700. The data access layer 810 directs data consumer data access requests to the appropriate databases 805, 806 and other components over network 811. In some cases, the data locator service can be incorporated as part of the data access layer 810.

The network 811 can include, but is not limited to, a cellular network (e.g., wireless phone), a point-to-point dial up connection, a satellite network, the Internet, a local area network (LAN), a wide area network (WAN), a WiFi network, an ad hoc network, an intranet, an extranet, or a combination thereof. The network may include one or more connected networks (e.g., a multi-network environment) including public networks, such as the Internet, and/or private networks such as a secure enterprise private network.

Server 700 may also implement software, including DBMS software, providing database storage capability and functionality to data consumers such as the front end server 802. In FIG. 8, source database 805, target database 806 and data locator 807 are shown as example instantiations of DBMS software. However, it should be understood that data locator 807 may be implemented using data structures different than source database 805 and target database 806.

Server 700 may also contain software to implement migration agent 820 functionality as described above. Migration agent may utilize network 811 and API calls (described earlier) to manipulate data structures in databases (805, 806, 807).

Server 700 may implement software comprising the data locator service 830, accessible over network 811 to data access layer 810 running on one or more front end servers. Data locator service 830 can be a central mediator for identifying active partitions and migration states. Data locator service 830 may be implemented as a programming function which may be accessible or "callable" through an API, as previously described.

FIG. 8 shows system components operative on separate server systems 700. It should be noted, however, that any or all of the software components described above as source database 805, target database 806, data locator 807, migration agent 820, and data locator service 830 need not be run on separate server(s) 700, and may indeed be run on the same server device.

Any reference in this specification to "one implementation," "an embodiment," "example implementation," etc., means that a particular feature, structure, or characteristic described in connection with the embodiment or implementation is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method of facilitating data requests from consumers to resources in a distributed computing environment, comprising:
   receiving a request for interacting with a database from a data consumer; and
   communicating the request to a data storage resource storing the database, the communicating carried out regardless of migration state of the database, wherein communicating the request comprises:
      confirming whether one or more partitions of the database are in an active state, wherein confirming that the one or more partitions of the database are in the active state comprises:
         communicating with a data locator to retrieve an indication of an active one or more partitions of the database to serve the request, wherein the indication of the active one or more partitions comprises a directed partition;
         reading metadata associated with the one or more partitions;
         determining whether or not the data locator and the directed partition indicate a same active partition;
         in response to determining that the data locator and the directed partition indicate the same active partition:
            returning the active partition; and
         in response to determining that the data locator and the directed partition do not indicate the same active partition:
            querying metadata on a corresponding partition on a remaining database for the active partition;
            selecting the active partition directed by a majority of the data locator, the directed partition and the corresponding partition; and
            returning the active partition; and
      in response to the active state of the one or more partitions being not confirmed, communicating the request to the database by performing the request on one of a source resource from or a target resource to which at least one of the one or more partitions is being migrated.

2. The method of claim 1, further comprising:
   in response to the active state of the one or more partitions being confirmed, communicating the request to the database by performing the request on the one or more partitions.

3. The method of claim 1, wherein the request for interacting with the database is a read request, wherein communicating the request to the data storage resource storing the database further comprises:
   mapping the request to the one or more active partitions; and
   retrieving data from the one or more active partitions.

4. A method of facilitating data requests from consumers to resources in a distributed computing environment, comprising:
   receiving a request for interacting with a database from a data consumer;
   obtaining a location of an active partition according to a pointer indicating an active data source, the pointer indicating whether a source partition or a target partition is the active data source;
   if the pointer indicates that the source partition is the active data source, communicating with the source partition to read source partition metadata, wherein the source partition metadata indicates whether the source partition is in an active state or an inactive state;
   if the source partition metadata of the source partition indicates that the source partition is in the active state, confirming that the source partition is the active partition and servicing the request from the data consumer using the source partition;
   if the source partition metadata of the source partition indicates that the source partition is in the inactive state, communicating with the target partition to confirm that the target partition is the active partition and service the request from the data consumer using the target partition;
   if the pointer indicates that the target partition is the active data source, communicating with the target partition to read target partition metadata, wherein the target partition metadata indicates whether the target partition is in the active state or the inactive state;
   if the target partition metadata of the target partition indicates that the target partition is in the active state, confirming that the target partition is the active partition and servicing the request from the data consumer using the target partition; and
   if the target partition metadata of the target partition indicates that the target partition is in the inactive state, communicating with the source partition to confirm that the source partition is the active partition and servicing the request from the data consumer using the source partition.

5. The method of claim 1, wherein the request for interacting with the database from the data consumer comprises a request for a cached data object, a value from a system-controlled identity field being appended to a user-controlled attribute in the target resource;
   wherein communicating the request to the data storage resource storing the database further comprises:
   requesting, from the data locator, a location of an active partition for the cached data object; and
   identifying and matching an identical data object on either the source resource by using the value from the system-controlled identity field or the target resource by using the user-controlled attribute.

6. A system for facilitating data requests from consumers to resources, the system comprising:
   a server comprising a data access layer, the data access layer receiving a request for interacting with a database from a data consumer and communicating the request to a data storage resource storing the database, the communication carried out regardless of migration state of the database, wherein the communicating of the request by the data access layer to the data storage resource storing the database comprises:
   communicating with a data locator service to obtain a location of an active partition according to a pointer indicating an active data source, the pointer indicating whether a source partition or a target partition is the active data source;
   if the pointer indicates that the source partition is the active data source, communicating with the source partition to read source partition metadata, wherein the source partition metadata indicates whether the source partition is in an active state or an inactive state;
   if the source partition metadata of the source partition indicates that the source partition is in the active state, confirming that the source partition is the active partition and servicing the request from the data consumer using the source partition;
   if the source partition metadata of the source partition indicates that the source partition is in the inactive state, communicating with the target partition to confirm that the target partition is the active partition and service the request from the data consumer using the target partition;
   if the pointer indicates that the target partition is the active data source, communicating with the target partition to read target partition metadata, wherein the target partition metadata indicates whether the target partition is in the active state or the inactive state;
   if the target partition metadata of the target partition indicates that the target partition is in the active state, confirming that the target partition is the active partition and servicing the request from the data consumer using the target partition; and
   if the target partition metadata of the target partition indicates that the target partition is in the inactive state, communicating with the source partition to confirm that the source partition is the active partition and servicing the request from the data consumer using the source partition.

7. The system of claim 6, wherein the server is a front end server of a distributed computing environment.

8. The system of claim 7, wherein the front end server is the data consumer.

9. The system of claim 6, wherein the server is a web server and includes a presentation layer, a business logic layer, and a data layer containing the data access layer.

10. The system of claim 6, wherein the data access layer includes the data locator service as an integrated data locator service.

11. The system of claim 6, wherein the data access layer further caches partition metadata such that the cache is first read before communicating with the source partition or the target partition to read or confirm the corresponding source partition metadata or target partition metadata.

12. The system of claim 11, wherein the partition metadata is cached for a variable length of time depending on what state of migration a current partition is in, the state of migration comprising a normal operation state and a migration state.

13. The method of claim 4, wherein during migration of data from the source partition to the target partition, the source partition is read-access available,
   wherein during the migration of the data from the source partition to the target partition, the source partition is also write-access available except during a time period when deltas are being transferred from the source partition to the target partition, wherein during the time period when deltas are being transferred from the source partition to the target partition, the source partition remains read-access available.

14. The method of claim 4, wherein the pointer indicates the source partition as the active partition during migration of a replica from the source partition to the target partition, wherein the pointer indicates the target partition as the active partition after a source delta is applied to the target partition.

15. The method of claim 14, wherein the source partition metadata changes from the active state to the inactive state and the target partition metadata changes from the inactive state to the active state after the source delta is applied to the target position.

* * * * *